(12) United States Patent
Larson (10) Patent No.: US 11,920,541 B2
(45) Date of Patent: Mar. 5, 2024

(54) PRECURSOR FORMULATIONS FOR A LINER, A ROCKET MOTOR INCLUDING THE LINER, AND RELATED METHODS

(71) Applicant: Northrop Grumman Systems Corporation, Falls Church, VA (US)

(72) Inventor: Robert S. Larson, Harrisville, UT (US)

(73) Assignee: Northrop Grumman Systems Corporation, Falls Church, VA (US)

(*) Notice: Subject to any disclaimer, the term of this patent is extended or adjusted under 35 U.S.C. 154(b) by 775 days.

(21) Appl. No.: 17/005,566

(22) Filed: Aug. 28, 2020

(65) Prior Publication Data

US 2022/0065197 A1 Mar. 3, 2022

(51) Int. Cl.
| | |
|---|---|
| C08G 18/80 | (2006.01) |
| C08F 36/06 | (2006.01) |
| C08G 18/48 | (2006.01) |
| C08G 18/69 | (2006.01) |
| C08G 18/72 | (2006.01) |
| C08L 71/08 | (2006.01) |
| F02K 9/34 | (2006.01) |

(52) U.S. Cl.
CPC ............. *F02K 9/346* (2013.01); *C08F 36/06* (2013.01); *C08G 18/4829* (2013.01); *C08G 18/69* (2013.01); *C08G 18/724* (2013.01); *C08G 18/80* (2013.01); *C08G 18/8016* (2013.01); *C08G 18/8019* (2013.01); *C08G 18/8077* (2013.01); *C08G 18/8093* (2013.01); *C08L 71/08* (2013.01)

(58) Field of Classification Search
CPC ... C08G 18/4829; C08G 18/69; C08G 18/724
See application file for complete search history.

(56) References Cited

U.S. PATENT DOCUMENTS

| | | | |
|---|---|---|---|
| 4,098,626 A | 7/1978 | Graham et al. | |
| 4,296,010 A * | 10/1981 | Tominaga | C08G 18/0814 524/901 |
| 4,803,019 A | 2/1989 | Graham et al. | |
| 5,191,020 A * | 3/1993 | Masamoto | C08G 75/0204 525/123 |
| 5,372,731 A * | 12/1994 | Michels | C08G 18/706 252/8.61 |
| 9,416,217 B2 | 8/2016 | Larson et al. | |
| 2009/0324957 A1* | 12/2009 | Wilke | C08G 18/6407 427/386 |

(Continued)

FOREIGN PATENT DOCUMENTS

| | | |
|---|---|---|
| CN | 107986926 A | 5/2018 |
| GB | 2561172 A | 10/2018 |

(Continued)

OTHER PUBLICATIONS

JP_11199851-A_07-1999_Masuda et al._English Translation.*

*Primary Examiner* — Michael L Leonard
(74) *Attorney, Agent, or Firm* — TraskBritt (57) ABSTRACT

A precursor formulation of a liner comprising a polymer and at least two curatives is disclosed. One of the at least two curatives comprises a curative formulated to preferentially react with the polymer and the other of the at least two curatives comprises a blocked curative formulated to be substantially unreactive with the polymer. A method of lining a rocket motor is also disclosed, as is a rocket motor including the liner.

20 Claims, 7 Drawing Sheets (56) References Cited

U.S. PATENT DOCUMENTS

| | | |
|---|---|---|
| 2017/0057885 A1 | 3/2017 | Desgardin et al. |
| 2018/0208521 A1 | 7/2018 | Stephens et al. |
| 2018/0215678 A1 | 8/2018 | Stephens et al. |
| 2018/0215860 A1 | 8/2018 | Doll et al. |
| 2019/0016645 A1 | 1/2019 | Larson et al. |
| 2019/0077725 A1 | 3/2019 | Doll et al. |
| 2020/0062669 A1 | 2/2020 | Burn et al. |
| 2021/0395436 A1* | 12/2021 | Turpen ............... C08G 18/8083 |

FOREIGN PATENT DOCUMENTS

| | | | |
|---|---|---|---|
| GB | 2572372 A | 10/2019 | |
| JP | 11199851 A * | 7/1999 | |
| KR | 10-0702574 B1 | 4/2007 | |
| WO | WO-2019029995 A1 * | 2/2019 | ............. B05D 5/062 |

* cited by examiner

PRECURSOR FORMULATIONS FOR A LINER, A ROCKET MOTOR INCLUDING THE LINER, AND RELATED METHODS

TECHNICAL FIELD

The disclosure relates generally to precursor formulations suitable for use as a liner, and to methods of using the precursor formulations as liners in rocket motors. More specifically, the disclosure relates to precursor formulations that include at least one blocked curative.

BACKGROUND

Rocket motors are used to propel many types of payloads at high speeds, such as in spacecraft and missile propulsion. A conventional rocket motor includes a casing, an insulation, a liner, and a propellant. The casing is generally made of metal, a composite material, or a combination of metal and composite materials. During use and operation, the insulation protects the casing from thermal and erosive effects of particle streams generated by combustion of the propellant. The insulation is attached to an interior surface of the casing and is made from a composition that, upon curing, is capable of enduring high temperature gases and erosive particles that are produced as the propellant burns. The liner attaches the propellant to the insulation and to any non-insulated interior surface portions of the casing. One surface of the liner is in contact with the insulation or the casing, and the other surface is in contact with the propellant. For effective operation of the rocket motor, the liner is securely attached to the insulation and, if applicable, the casing, and the liner and the propellant are securely attached to one another.

Conventional liners include a polymeric binder and a curing agent, such as a curative. Conventional propellants include a fuel, an oxidizer, a polymeric binder, and a curing agent, such as a curative. To ensure compatibility, the precursor formulations of the liner and the propellant generally include similar ingredients; however, the liner typically does not include a fuel or an oxidizer. For example, the liner and the propellant may include the same or a similar polymeric binder, meaning that the polymer of the liner and the polymer of the propellant may include the same functional groups. The propellant is formulated to provide thrust for attaining rocket motor propulsion during combustion. The liner is formulated to protect the casing from corrosive conditions generated during operation of the rocket motor. During fabrication of the rocket motor, the insulation is prepared and secured to the casing. The liner is then prepared and applied to the insulation, and it is cured at an elevated temperature. The curing process may take up to a few days. The propellant is then prepared, applied to the liner, and cured. This process is complex, time-consuming, and expensive.

The combustion of the propellant generates extreme conditions within the casing. For example, temperatures inside the casing commonly reach 2,760° C. (5,000° F.). These conditions, in combination with a restrictive throat region of a nozzle passageway, create a high degree of gas turbulence within the casing and nozzle. In addition, gases produced during propellant combustion contain high-energy particles that, under a turbulent environment such as the one encountered in a rocket motor, erode the liner and the insulation. If the burning propellant penetrates the insulation and the liner, the casing may melt or otherwise be compromised, causing failure of the rocket motor. A large number of rocket motor failures occur due to failure of the attachment between the insulation, the liner, and the propellant. For instance, diffusion of an isocyanate curative of the propellant into the liner produces a soft layer at the liner-propellant interface that is prone to failure. At the time of applying the propellant, a majority of its curative has not reacted with the polymeric binder and is thus free to diffuse into the liner. If diffusion occurs, the portion of the propellant proximal to the liner is deficient in curative, which produces a weak layer of propellant attached to the liner. Further, if a majority of the curative diffuses into the liner, an area of uncured propellant remains next to the liner, thus compromising the attachment. Moisture or contamination at any point in the process may also result in a weak attachment between the insulation and the liner or the liner and the propellant.

Some attempted solutions to compensate for the diffusion of the curative from the propellant and into the liner have incorporated an aziridine compound into liner formulations that include hydroxyl terminated polybutadiene (HTPB), carboxyl terminated polybutadiene (CTPB), or polybutadiene acrylonitrile (PBAN). The aziridine compound diffuses into the propellant and polymerizes in the presence of ammonium perchlorate to augment the HTPB, CTPB, or PBAN crosslinking. However, this has not sufficiently addressed the needs of the industry because the aziridine compound is only effective with liner formulations that include HTPB, CTPB, or PBAN, and is therefore not suitable for use with a broad range of liner and propellant formulations.

Another attempted solution to reduce the diffusion of curative into the liner has involved applying an isocyanate solution to the surface of a cured liner or insulation, thus leaving the isocyanate solution available to cure the propellant near the liner. However, this leaves the isocyanate, which is a reactive material, exposed to environmental moisture, which compromises the effectiveness of the isocyanate solution.

BRIEF SUMMARY

Embodiments of the disclosure disclosed and taught herein are directed to precursor liner compositions, including compositions that include a polymer and at least two curatives, at least one of which is a blocked curative formulated to be unreactive with the polymer.

A precursor formulation of a liner is disclosed. The precursor formulation includes a polymer and at least two curatives. One of the at least two curatives includes a curative formulated to preferentially react with the polymer and the other of the at least two curatives includes a blocked curative formulated to be substantially unreactive with the polymer.

Also disclosed is a method of lining a rocket motor. The method includes applying a precursor liner formulation of a liner to a rocket motor. The precursor liner formulation includes a liner polymer and at least two curatives. One of the at least two curatives includes a curative formulated to preferentially react with the liner polymer and the other of the at least two curatives includes a blocked curative formulated to be substantially unreactive with the liner polymer. The method also includes reacting the liner polymer with the preferentially reactive curative to form a liner, applying a precursor propellant formulation to the liner, and reacting a propellant polymer of the precursor propellant formulation with the blocked curative of the precursor liner formulation.

Also disclosed is a rocket motor including a casing, an insulation, a liner, and a propellant. The liner includes a reaction product of a liner polymer and a curative formulated to preferentially react with the liner polymer, as well as a blocked curative formulated to be substantially unreactive with the liner polymer. The propellant includes a reaction product of a propellant polymer, the blocked curative, and a propellant curative.

BRIEF DESCRIPTION OF THE DRAWINGS

While the specification concludes with claims particularly pointing out and distinctly claiming what are regarded as embodiments of the disclosure, various features and advantages of this disclosure may be more readily ascertained from the following description of example embodiments provided with reference to the accompanying drawings, in which:

DETAILED DESCRIPTION

A precursor formulation of a liner is disclosed, as well as methods of using the precursor formulation to form a liner in a rocket motor. The precursor formulation of the liner includes a polymer and at least two curatives, where one of the curatives preferentially reacts with the polymer and another of the curatives is a blocked curative (e.g., a blocked isocyanate curative), which is formulated to be substantially unreactive with the polymer. While the blocked isocyanate curative is substantially unreactive with the liner polymer, the blocked isocyanate curative is reactive with a propellant polymer of a precursor formulation of a propellant. When the precursor formulation is cured to form the liner, the preferentially reactive curative crosslinks the polymer of the precursor formulation of the liner, while the blocked curative remains substantially unreacted. Thus, while the preferentially reactive curative reacts with the liner polymer to cure the precursor formulation of the liner, little or none of the blocked isocyanate curative reacts to cure the liner. As a result of being substantially unreactive with the liner polymer, the blocked isocyanate curative remains available to diffuse into a precursor formulation of a propellant of the rocket motor and to crosslink the polymer of the precursor formulation of the propellant.

As used herein, the term "may" with respect to a material, structure, feature, or method act indicates that such is contemplated for use in implementation of embodiments of the disclosure, and such term is used in preference to the more restrictive term "is" so as to avoid any implication that other compatible materials, structures, features, and methods usable in combination therewith should or must be excluded.

As used herein, the terms "comprising," "including," "containing," "characterized by," and grammatical equivalents thereof are inclusive or open-ended terms that do not exclude additional, un-recited elements or method steps, but also include the more restrictive terms "consisting of," "consisting essentially of," and grammatical equivalents thereof.

As used herein, the singular forms following "a," "an," and "the" are intended to include the plural forms as well, unless the context clearly indicates otherwise.

As used herein, the term "about" in reference to a numerical value for a particular parameter is inclusive of the numerical value and a degree of variance from the numerical value that one of ordinary skill in the art would understand is within acceptable tolerances for the particular parameter. For example, "about" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, "substantially" means and includes greater than about 95%, such as greater than about 99%.

As used herein, the term "blocked curative" and its grammatical equivalents means and include an isocyanate compound that has been reacted with a blocking agent to prevent the isocyanate compound from reacting with a polymer at room temperature. The blocking agent is formulated to be removed (e.g., unblocked) from the isocyanate compound or is formulated to become reactive (e.g., formulated to induce a transesterification reaction) at an elevated temperature.

As used herein, the term "precursor formulation" means and includes ingredients of the formulation before the ingredients are reacted (e.g., cured).

As used herein, the term "substantially unreactive curative" and its grammatical equivalents refers to a curative that reacts with the liner polymer at a slower rate than the preferentially reactive curative at a temperature of less than about 100° C. (e.g., at a temperature between about 20° C. and about 100° C.). For example, the substantially unreactive curative may react with the liner polymer at a rate that is between about 15 times and 100 times slower (e.g., about 50 times slower) than the preferentially reactive curative at a temperature of less than about 100° C.

As used herein, the term "preferentially reactive curative" and its grammatical equivalents refers to a curative that reacts with the liner polymer at a faster rate than the substantially unreactive curative at a temperature of less than about 100° C. (e.g., at a temperature between about 20° C. and about 100° C.). For example, the preferentially reactive curative may react with the liner polymer at a rate that is between about 15 times and 100 times faster (e.g., about 50 times faster) than the substantially unreactive curative at a temperature of less than about 100° C.

The illustrations presented herein are not actual views of any particular material, device, system, or method, but are merely idealized representations that are employed to describe embodiments of the disclosure. The figures are not necessarily drawn to scale. Additionally, elements common between figures may retain the same numerical designation.

Embodiments of the disclosure include precursor formulations of a liner that may be used in rocket motors as a liner for an isocyanate-cured solid rocket propellant. The precursor formulations of the liner include a polymer and at least two curatives (e.g., crosslinkers). For convenience, the polymer in the precursor formulations of the liner may also be referred to herein as the "liner polymer," and the polymer in the precursor formulations of the propellant may also be referred to herein as the "propellant polymer." The curatives in the precursor formulations of the liner include at least one curative that is preferentially reactive with the liner polymer, as well as at least one blocked curative that is substantially non-reactive with the liner polymer. The preferentially reactive curative reacts with the liner polymer to cure the liner, whereas the blocked curative does not substantially react (e.g., is substantially non-reactive) with the liner polymer and remains available to diffuse into the propellant, supplementing the crosslink density of the propellant polymer that is proximal to the liner. As a result, the precursor formulations of the liner according to embodiments of the disclosure mitigate the problem of curative loss in the propellant layer of a rocket motor, improving the strength and reliability of the attachment between the liner and the propellant. Consequently, the liner-propellant interface may have the desired mechanical properties.

The blocked isocyanate curatives of the precursor liner formulations and methods of utilizing them in rocket motors in accordance with the disclosure are advantageous over conventional formulations because the blocked isocyanate curatives ensure that the crosslink density of the propellant remains within acceptable tolerances, which ensures a strong attachment between the propellant and the liner, and improves the reliability of the rocket motor. Further, the precursor liner formulations of the disclosure may include blocked isocyanate curatives that are insensitive to environmental effects such as moisture, and thus do not suffer from the issues that conventional isocyanate curatives do. The precursor liner formulations of the disclosure are also effective with a broad range of propellant formulations, and may be considered so-called "universal liners" capable of binding ammonium perchlorate composite (e.g., aluminum (Al)/ammonium perchlorate (AP)/hydroxyl-terminated polybutadiene (HTPB)) type propellants and nitrate ester plasticized polyether (NEPE) type propellants, as well as inert propellant simulants. Further, the precursor liner formulations of the disclosure may be used in systems with highly plasticized, hydroxyl terminated polyethylene (HTPE) type propellants, which are notoriously difficult to bond with conventional liners. As a result, using the precursor liner formulations of the disclosure may allow for much easier processing and also enable the use of existing processing equipment.

The precursor formulation of the liner includes a liner polymer. The liner polymer may be a polymer formulated to be curable by reacting with the curative that is preferentially reactive. The liner polymer may include hydroxyl functional groups that react with isocyanate groups of the preferentially reactive curative to form urethane crosslinkages. The polymer may be a polyether, a fluorinated polyether, a polyurethane, an epoxy, a polysulfide, a polyethylene oxide, a polybutadiene, or a polyester. For example, the polymer may be a hydroxyl terminated polybutadiene (HTPB) (e.g., R45M), a hydroxyl terminated polyethylene (HTPE), a hydroxyl terminated polyether, a carboxyl terminated polybutadiene, or a butadiene terpolymer (e.g., polybutadiene acrylonitrile). The HTPB may be that commercially available from Cray Valley Hydrocarbon Specialty Chemicals (Exton, Pa.), such as under the POLY BD® tradename. The HTPE may be PLURACOL® 1026, which is a polyether alcohol commercially available from BASF Corp. (Florham Park, N.J.). PLURACOL® 1026 has a nominal functionality of 3, an —OH number average of 27, a nominal molecular weight of 6000, and a viscosity of 1320 cps at 25° C. In accordance with some embodiments of the disclosure, the liner polymer is HTPB. In accordance with other embodiments of the disclosure, the liner polymer is HTPE. The precursor formulation may include from about 10% by weight to about 85% by weight of the liner polymer, such as from about 30% by weight to about 65% by weight of the liner polymer or from about 40% by weight to about 80% by weight of the liner polymer. The liner polymer may also function as a binder for the liner. In another embodiment, the liner polymer is HTPB, such as that commercially available from Cray Valley Hydrocarbon Specialty Chemicals (Exton, Pa.) under the POLY BD® tradename.

The liner polymer is cured with one or more preferentially reactive curatives, which may include a polyfunctional isocyanate reactive crosslinking agent. This polyfunctional isocyanate may include an aromatic or aliphatic isocyanate, such as methylene diphenyl diisocyanate (MDI), dicyclohexylmethane-4,4'-diisocyanate (H12MDI), polymeric methylene diisocyanate (pMDI), para-phenylene diisocyanate (PPDI), toluene diisocyanate (TDI), isophorone diisocyanate (IPDI), dimeryl diisocyanate (DDI), hexamethylene diisocyanate (HDI), or combinations thereof. The preferentially reactive isocyanates may be obtained from numerous sources, such as Dow Chemical Company (Midland, Mich.), Bayer MaterialScience AG (Leverkusen, Germany), or Huntsman Corp. (The Woodlands, Tex.), or Evonik Industries AG (Parsippany, N.J.). In accordance with embodiments of the disclosure, the preferentially reactive curative is MDI. In another embodiment, the preferentially reactive curative is PPDI. In yet another embodiment, the preferentially reactive curative is IPDI. The preferentially reactive curative may be present in the precursor formulation of the liner at an amount sufficient to crosslink the liner polymer. For example, the NCO:OH ratio of the preferentially reactive curative:liner polymer may be from about 0.9 to about 1.5 (e.g., about 1.35).

The precursor formulation of the liner also includes one or more blocked curatives and more particularly one or more blocked isocyanate curatives, which are formulated to be substantially unreactive with the liner polymer. The blocked isocyanate has been pre-reacted with a blocking agent, which prevents the isocyanate from reacting with the polymer at room temperature. The blocking agent has been pre-reacted with isocyanate functional groups of the isocyanate. The blocked isocyanate, thus, is a reaction product of the isocyanate curative and the blocking agent. The blocking agent will unblock (e.g., be released) from the isocyanate at elevated temperatures to either regenerate the isocyanate to enable the precursor formulation to cure, or will induce a transesterification reaction to cure the precursor formulation. Without being bound by any theory, it is believed that the blocked isocyanate curative within the liner functions as a propellant reinforcing agent rather than as a liner curative. The blocked isocyanate curative may include an aromatic, aliphatic or cycloaliphatic isocyanate, such as isophorone diisocyanate (IPDI), IPDI trimers, dimer diisocyanate (DDI), dicyclohexylmethane-4,4'-diisocyanate (H12MDI), hexamethylene diisocyanate (HDI), HDI trimers, cyclohexyl diisocyanate (CHDI), tetramethyl xylene diisocyanate (TMXDI), or combinations thereof. In some embodiments, the blocked isocyanate is based on IPDI. In other embodiments, the blocked isocyanate is based on HDI trimers. The blocking agent may include, but is not limited to, diethylmalonate (DEM), dimethylpyrazole (DMP), 1,2-pyrazole, 1,2,4-triazole, diisopropylamine, methylethylketoxime (MEKO), caprolactam, and nitro-phenol derivatives, or combinations thereof. By way of example only, the blocked isocyanate may be a DEM-blocked isocyanate, such as an IPDI isocyanate having DEM functional groups reacted with the IPDI, or an HDI trimer isocyanate having DEM functional groups reacted with the HDI trimer. Alternatively, the blocked isocyanate may be a MEKO-blocked isocyanate, in which the MEKO functional group is reacted with IPDI, or the MEKO functional group is reacted with HDI trimer isocyanate.

In accordance with embodiments of the disclosure, the blocked isocyanate is a DEM-blocked isocyanate, which includes a 1,3-dicarbonyl compound (e.g., between about 20° C. and about 25° C.). The DEM-blocked isocyanate has an unblocking range (e.g., the temperature range between which the blocking agent is released) of between about 100° C. and about 120° C. when used with an aliphatic isocyanate. The DEM-blocked isocyanate may have a melting point of about −50° C., and a boiling point of about 200° C. The DEM-blocked isocyanate may have an NCO content between about 1% and 20% by weight (e.g., about 10%). The DEM-blocked isocyanate may be commercially available as Vestanat® B1042E, which is an IPDI-based isocyanate commercially available from Evonik Industries (Parsippany, N.J.). Vestanat® B1042E has a viscosity of about 1.5 cps at 23° C. Another exemplary DEM-blocked isocyanate is commercially available as Desmodur® BL 3475, which is an HDI/IPDI-based isocyanate commercially available from Covestro AG (Pittsburgh, Pa.). Desmodur® BL 3475 has a blocked NCO content of about 8.2% and a viscosity of about 850 cps at 25° C. Yet another exemplary DEM-blocked isocyanate is Desmodur® BL 3370, which is an HDI-based blocked aliphatic isocyanate commercially available from Covestro AG (Pittsburgh, Pa.). Desmodur® 3370 has a blocked NCO content of about 8.9% and a viscosity of about 3200 cps at 25° C. Yet another exemplary DEM-blocked isocyanate is Trixene® BI 7963, which is an HDI-based blocked aliphatic isocyanate commercially available from Tri-Iso, Inc. (Cardiff by the Sea, Calif.). Trixene® BI 7963 has a viscosity of about 4500 cps at 25° C.

The blocked isocyanate curative may be present in the precursor formulation of the liner at a range of from about 0.5% by weight to about 10% by weight, such as from about 1% by weight to about 8% by weight or from about 1% by weight to about 5% by weight (e.g., about 3% by weight). In precursor formulations of the disclosure, the blocked isocyanate curative may be present in an amount relative to the preferentially reactive curative. For example, in a precursor formulation of the disclosure, the preferentially reactive curative may be present in a range from about 1% to about 15% by weight (e.g., about 6%), and the substantially unreactive curative may be present in a range from about 1% to about 5% by weight (e.g., about 3%).

In accordance with other embodiments of the disclosure, the blocked isocyanate is a MEKO-blocked isocyanate, which includes an isocyanate compound having an oxime functional group. The MEKO-blocked isocyanate has an unblocking range of between about 120° C. and about 160° C. The MEKO-blocked isocyanate may have a melting point of about 30° C., and a boiling point of about 150° C. The MEKO-blocked isocyanate may have an NCO content between about 1% and 20% by weight (e.g., about 12%). The MEKO-blocked isocyanate may be commercially available as Vestanat® B1358A, which is an IPDI-based isocyanate commercially available from Evonik (Parsippany, N.J.). Vestanat® B1358A has an NCO content of 8% and a viscosity of about 5.0 cps at 23° C. Another exemplary MEKO-blocked isocyanate is commercially available as Baybond® XL 6366, which is an HDI-based isocyanate commercially available from Covestro AG (Pittsburgh, Pa.). Baybond® XL 6366 has a blocked NCO content of about 12.5%. Yet another exemplary MEKO-blocked isocyanate is Trixene® BI 7984, which is an HDI-based blocked aliphatic isocyanate commercially available from Tri-Iso, Inc. (Cardiff by the Sea, Calif.). Trixene® BI 7984 has a viscosity of 3000 cps at 25° C.

The blocked isocyanate curatives, such as the DEM-blocked isocyanate curatives or the MEKO-blocked isocyanate curatives, were unexpectedly found to be advantageous over other isocyanates. This was unexpected because the isocyanate curatives had similar chemical compositions, as well as similar functions. Without being bound by any theory, it is believed that the blocked isocyanate curatives are more soluble in the polymer of the precursor formulations than are the non-blocked isocyanate curatives. The increased solubility in the liner polymers is believed to increase the availability of the blocked isocyanate curative to diffuse into the propellant polymer to form a strong attachment between the liner and the propellant. The blocked isocyanate curatives function as a source of diffusible curative within the liner, and were thus able to function as a propellant reinforcing curative. Including the DEM-blocked isocyanates in the formulations is also advantageous because the DEM-blocked isocyanates exhibit a relatively low unblock temperature (about 110° C.), which may result in a heightened reactivity with the propellant polymer.

While various examples herein describe the blocked and preferentially reactive curatives as isocyanates, other curatives may be used as long as at least one of the curatives remains substantially unreacted with the liner polymer during cure of the precursor liner formulation.

Depending on the desired mechanical and physical properties of the liner, the precursor liner formulation of the disclosure may optionally include additional ingredients, such as at least one plasticizer, at least one filler, at least one additive, at least one diluent, at least one antioxidant, at least one catalyst, at least one flame retardant, or combinations thereof. Such ingredients are conventional in the rocket motor liner art and, therefore, are not described in detail herein. The optional ingredients may also be used to facilitate processing of the precursor liner formulation. Since the precursor formulation of the liner includes a blocked isocyanate curative, no aziridine compound is present. The filler may include, but is not limited to, carbon black, silica, aluminum trihydrate, magnesium dihydroxide, zinc borate, glass, other microspheres, or combinations thereof.

The precursor formulation may be produced by conventional techniques, such as by combining (e.g., mixing) the ingredients. The polymer, preferentially reactive curative, blocked isocyanate curative, and any optional ingredients may be combined in any order to produce the precursor formulation of the liner. Methods of applying and curing the precursor formulation of the liner are known in the art, and are thus not described in detail herein. Briefly, the ingredients may be combined at a temperature of greater than or equal to about 20° C., and the resulting precursor formulation of the liner applied to a casing of the rocket motor and cured, forming the liner on an interior surface of the casing. The cure time may fall within a range of from about 1 day to about 30 days, and more particularly from about 5 days to about 25 days (e.g., about 14 days). In some embodiments, the precursor formulation according to embodiments of the disclosure is cured for an amount of time ranging from about 1 day to about 4 days at a temperature of about 40° C. to about 60° C. While the curing may occur at room temperature (between about 20° C. and about 25° C.), the curing may be accelerated by the application of at least one of heat and pressure, as is known in the art.

The propellant polymer may be the same as or a different polymer than is used in the liner polymer. To increase compatibility between the liner and propellant, at least one ingredient, such as the polymer, of the liner and propellant may be similar (i.e., chemically similar). For example, the liner polymer and the propellant polymer may have the same functional group(s). The propellant may include a polyether (e.g., HTPE or NEPE), a butadiene terpolymer (e.g., PBAN), HTPB, CTPB, a similar composite used in propellants, or combinations thereof. The propellant may or may not include ammonium perchlorate (AP). The propellant may include other ingredients, such as at least one plasticizer, at least one filler, at least one diluent, at least one antioxidant, at least one catalyst, a burn rate modifier, or combinations thereof. Such ingredients are conventional in the rocket motor propellant art and, therefore, are not described in detail herein.

The precursor formulation of the propellant may be produced by conventional techniques, such as by combining (e.g., mixing) the ingredients. Methods of applying the precursor formulation of the propellant are known in the art and are thus not described in detail herein. Briefly, the ingredients may be combined at a temperature within a range of about 20° C. to about 200° C. (e.g., about 110° C.), and the resulting precursor formulation of the propellant applied to the liner and cured, forming the propellant over the liner. The curing may be accelerated by the additional application of at least one of heat and pressure, as is known in the art.

Because the blocked isocyanate curative is substantially unreactive with the liner polymer, a source (e.g., a pool) of blocked isocyanate curative remains in the liner. This pool of unreacted curative is available to diffuse from the liner into the propellant, which may compensate (e.g., correct) for the curative loss in the interfacial propellant layer. In behaving as a replacement propellant curative, the blocked isocyanate curative functions to ensure that the propellant polymer has a crosslink density within acceptable tolerances at the interface between the liner and the propellant, which may increase the strength of the attachment between the polymer and the liner. As a result, the liner-propellant interface may have the desired mechanical properties.

Figure 1:
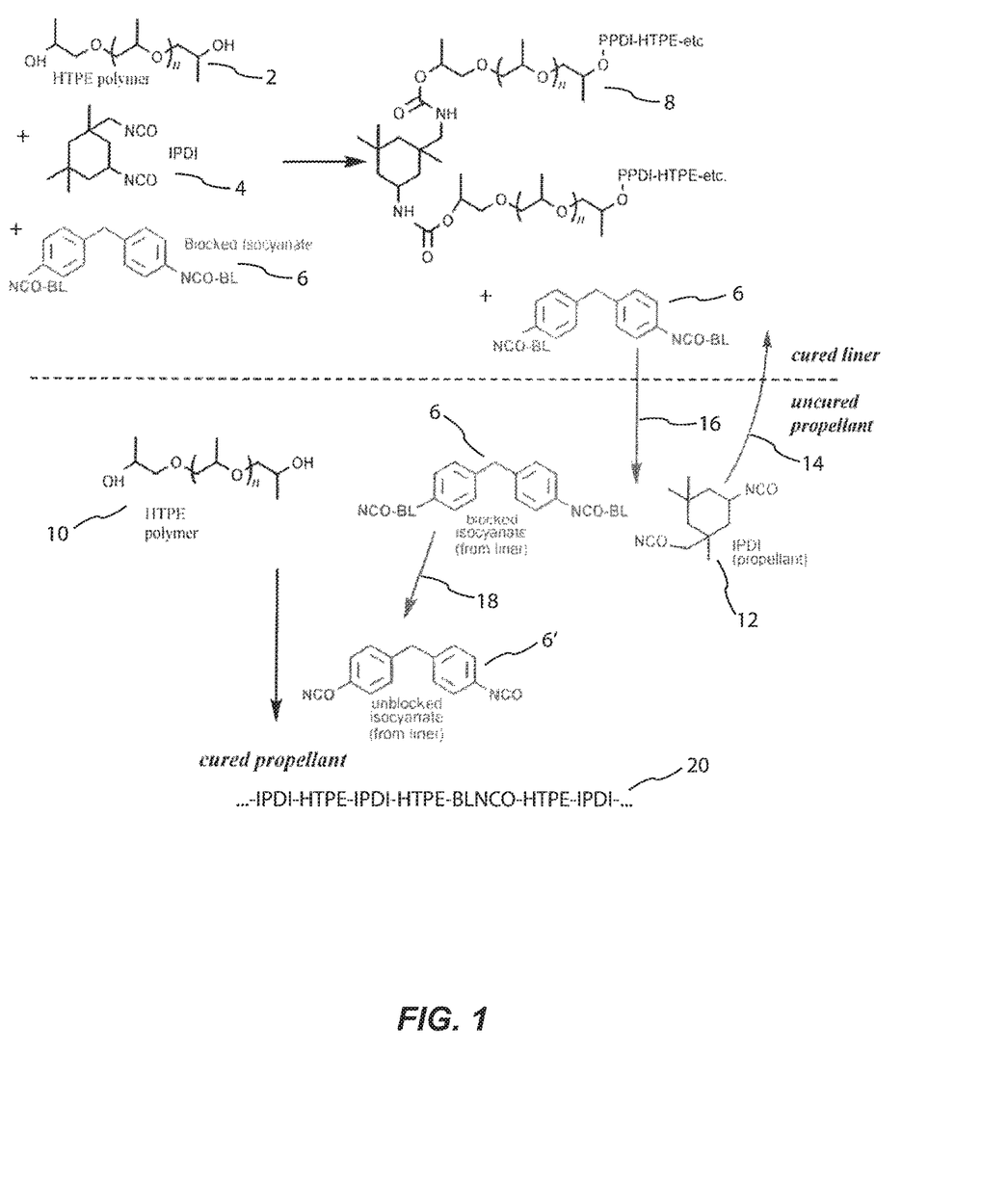
FIG. 1 is a schematic illustrating a reaction of at least one blocked curative according to embodiments of the disclosure.

FIG. 1 illustrates an exemplary reaction schematic showing the reaction of a liner polymer 2 of a precursor formulation of the liner with the preferentially reactive curative 4 to produce polymerized liner polymer 8, followed by diffusion of the blocked isocyanate curative 6 of the precursor formulation of the liner into the precursor formulation of the propellant. The precursor formulation of the liner including the liner polymer 2, preferentially reactive curative 4, and blocked isocyanate curative 6 may be prepared as previously described. While the liner polymer 2 is illustrated in FIG. 1 as HTPE and the preferentially reactive curative 4 is illustrated in FIG. 1 as IPDI, other polymers or curatives may be used. In FIG. 1, "BL" refers to the blocking agent. Other ingredients (not shown) may be present in the precursor formulation of the liner including fillers, plasticizers, diluents, and catalysts, as previously described. The preferentially reactive curative 4 may react with the liner polymer 2 to form the polymerized liner polymer 8, while the blocked isocyanate curative 6 remains substantially unreacted in the resulting liner. Upon casting of the precursor formulation of the propellant, which includes the propellant polymer 10 and a propellant curative 12, a portion of the propellant curative 12 may diffuse into the liner, which is indicated by the arrow labeled "14." Other ingredients (not shown) may be present in the precursor formulation of the propellant. While the propellant polymer 10 is illustrated in FIG. 1 as HTPE and the propellant curative 12 is illustrated in FIG. 1 as IPDI, other polymers or curatives may be used. The blocked isocyanate curative 6 may diffuse from the liner into the precursor formulation of the propellant, which is indicated by the arrow labeled "16." At elevated temperatures (e.g., about 110° C. or greater), the blocked isocyanate curative 6 unblocks to form an unblocked isocyanate 6' that reacts to cure the propellant, which is indicated by the arrow labeled "18." Since the unblocked isocyanate curative 6' is formulated to react with the propellant polymer 10, the unblocked isocyanate curative 6' assists in polymerization of the propellant polymer 10. The unblocked isocyanate curative 6' may supplement the propellant curative 12 to polymerize the propellant polymer 10 and form the polymerized propellant polymer 20. Thus, the unblocked isocyanate curative 6' and the propellant curative 12 may be used to polymerize the propellant polymer 10.

Figure 2:
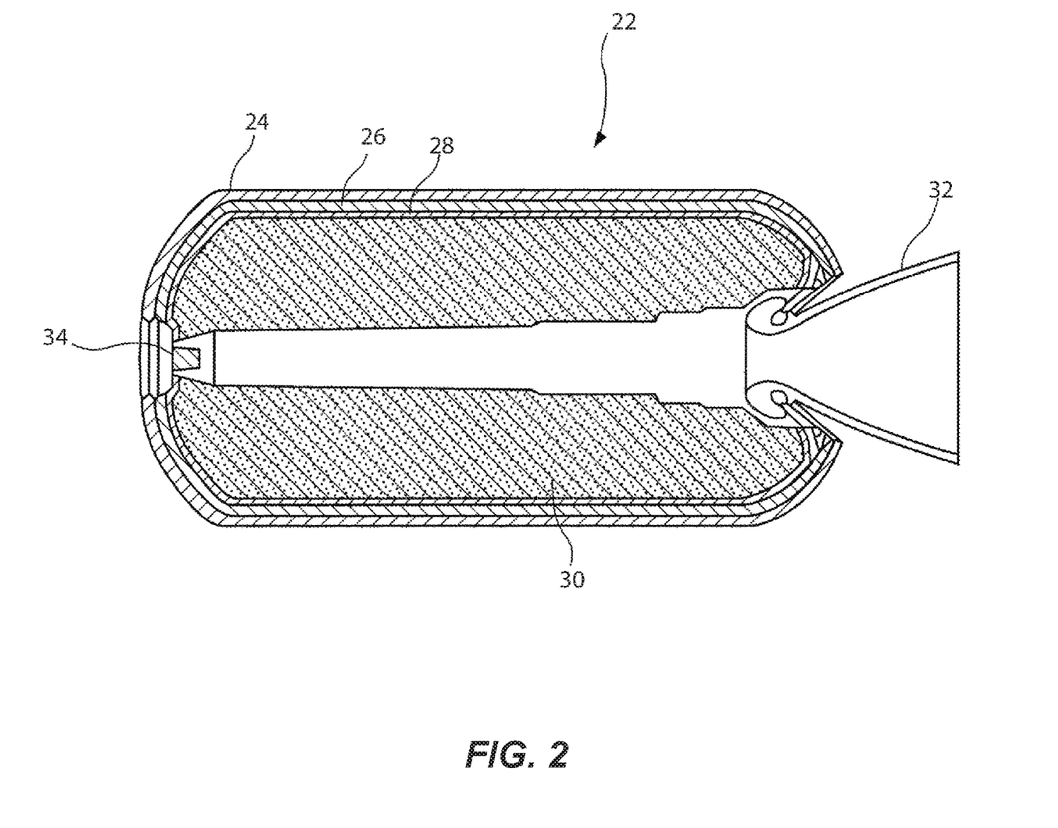
FIG. 2 is a simplified cross-section of a rocket motor including a liner formed from a precursor formulation according to embodiments of the disclosure.

As shown in FIG. 2, the precursor formulation of the liner may be used in a rocket motor 22, which may include a casing 24, an insulation 26, a liner 28, and a propellant 30. The liner 28 may be formed from embodiments of the precursor liner formation having at least one blocked isocyanate curative that does not substantially react to cure the liner, as previously described. The rocket motor 22 may also include a nozzle assembly 32, an igniter 34, and other conventional components, which are not illustrated for simplicity and convenience. The liner 28 includes a reaction product (e.g., the polymerized liner polymer 8) of the liner polymer 2 and the preferentially reactive curative 4, while the propellant 30 includes a reaction product (e.g., the polymerized propellant polymer 20) of the propellant polymer 10, the unblocked isocyanate curative 6', and the propellant curative 12. Both the liner 28 and propellant 30 may also include residual (e.g., trace) amounts of the blocked isocyanate curative 6. As used herein, the term "residual" means and includes less than about 1% by weight, such as less than about 0.5% by weight. Residual (e.g., trace) amounts of the preferentially reactive curative 4 may also be present in the liner 28.

Without being bound by any theory, it is believed that by using at least one blocked isocyanate curative in the precursor formulation of the liner, the blocked isocyanate curative may become encased in the polymerized liner polymer following cure of the precursor formulation. By encasing the blocked isocyanate curative in a matrix of the liner polymer, the blocked isocyanate curative may be protected from environmental conditions during application and cure of the precursor formulation of the propellant. The blocked isocyanate curative is also believed to be protected from environmental conditions by virtue of having been reacted with a blocking agent, which further protects the isocyanate functional groups from exposure to the environmental conditions. As a result, the shelf-life of the resulting liner may be increased. Use of the at least one blocked isocyanate curative in the precursor formulation of the liner also enables a wider range of propellants to be used with the liner, as previously discussed.

The following examples serve to further illustrate embodiments of the disclosure in more detail. These examples are not to be construed as being exhaustive or exclusive as to the scope of this disclosure.

In some embodiments, the precursor formulations of the liner also included triphenyl bismuth and dinitrosalicylic acid, which are commercially available from numerous sources.

Samples utilized in the following tests were formed from the exemplary precursor formulations described in Table 1 below, and an ammonium sulfate-filled, R45M-based propellant simulant was utilized as the propellant in testing.

TABLE 1

Precursor Formulations of the Liner

| Precursor Formulation | Polymer (wt %) | Preferentially Reactive Curative (wt %) | Less Reactive Curative (wt %) | Blocked Isocyanate Curative (wt %) | Catalysts (wt %) | Fillers (wt %) |
| --- | --- | --- | --- | --- | --- | --- |
| A | HTPB (42.43), Trifunctional polyol (10.36) | MDI (10.48) | IPDI Trimer (2.97) | (0) | Triphenyl bismuth (0.10) | Carbon black (32.67), Fumed silica (0.99) |
| B | HTPB (57.63) | IPDI (5.58) | (0) | DEM-blocked (2.97) | Triphenyl bismuth (0.10), Dinitrosalicylic acid (0.05) | Carbon black (32.67), Fumed silica (1.00) |
| D | HTPB | IPDI | ND | (0) | ND | ND |

ND = Not disclosed

EXAMPLES

Example 1

Precursor Formulations of the Liner

Precursor formulations of a liner were prepared in accordance with embodiments of the disclosure and included the ingredients shown in Table 1. The liner polymer was HTPB (commercially available from Cray Valley Hydrocarbon Specialty Chemicals (Exton Pa.) under the POLY BD® tradename). The liner polymer may also include a trifunctional polyol (commercially available from Huntsman Corp. (The Woodlands, Tex.) under the Jeffol® FX31-240 tradename). The preferentially reactive curative was IPDI (commercially available from Evonik Industries AG (Parsippany, N.J.) under the Vestanat® tradename) or MDI (commercially available from BASF Corp. (Florham Park, N.J.) under the Lupranate® MI tradename). The less reactive curative was an IPDI trimer (commercially available from Evonik Industries AG (Parsippany, N.J.) under the Vestanat® T1890/100 tradename). The blocked isocyanate curative was an HDI-based DEM-blocked isocyanate (commercially available from Covestro AG (Pittsburgh, Pa.) under the Desmodur® BL 3370 tradename). In some embodiments, the precursor formulations of the liner also included carbon black (commercially available from Cancarb Limited (Alberta, Canada) under the Thermax® N991 tradename) and fumed silica (commercially available from Cabot Corp. (Boston, Mass.) under the Cab-O-Sil® TS-720 tradename).

Precursor Formulation A included a more reactive curative and a less reactive curative, as disclosed in U.S. Pat. No. 9,416,217, compared to the blocked curative and the preferentially reactive curative in Precursor Formulation B. Precursor Formulation D is proprietary, but is a control formation and is generally comprised of an HTPB-based polymer with an IPDI-based curative that also includes an aziridine compound.

Example 2

Testing and Analysis of the Precursor Formulations of the Liner

Penetrometer tests, rectangular bond-in-tension (RBIT) tests, and 90-degree peel tests were performed on liner formulations formed in accordance with the precursor liner formulations of the disclosure, such as those listed in Table 1. The tests were conducted using conventional techniques.

Figure 3:
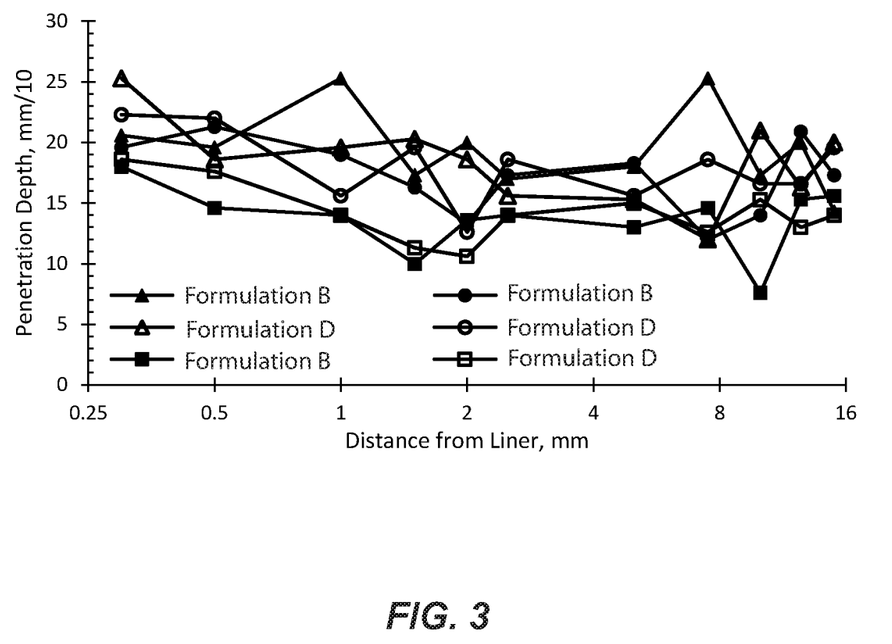
FIG. 3 is a graph illustrating penetrometer testing of conventional liners compared with liners formed from precursor formulations according to embodiments of the disclosure.

FIG. 3 illustrates penetrometer profiles comparing liners formed from precursor formulations of the disclosure (e.g., Precursor Formulation B) with conventional liners (e.g., Precursor Formulation D). FIG. 3 shows penetration depth as a function of distance. The penetrometer data indicates that the liner formulations of the disclosure (solid symbols) showed lower probe penetration depths than the conventional liners (open symbols) close to the interface between the propellant and the liner. With the liners of the disclosure exhibiting increased hardness compared to the conventional liners, the use of the blocked isocyanate curative in the liners was found to increase the crosslinking density of the propellant polymer.

Figure 4:
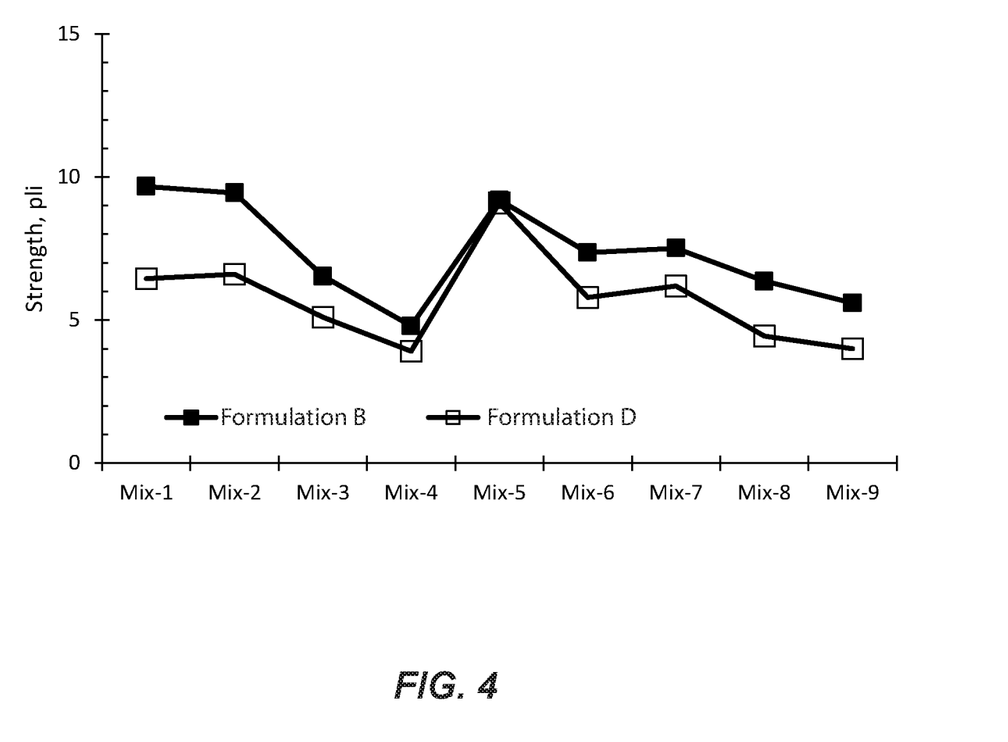
FIG. 4 is a graph illustrating 90-degree peel testing of conventional liners compared with a liner formed from a precursor formulation according to embodiments of the disclosure.
Figure 5:
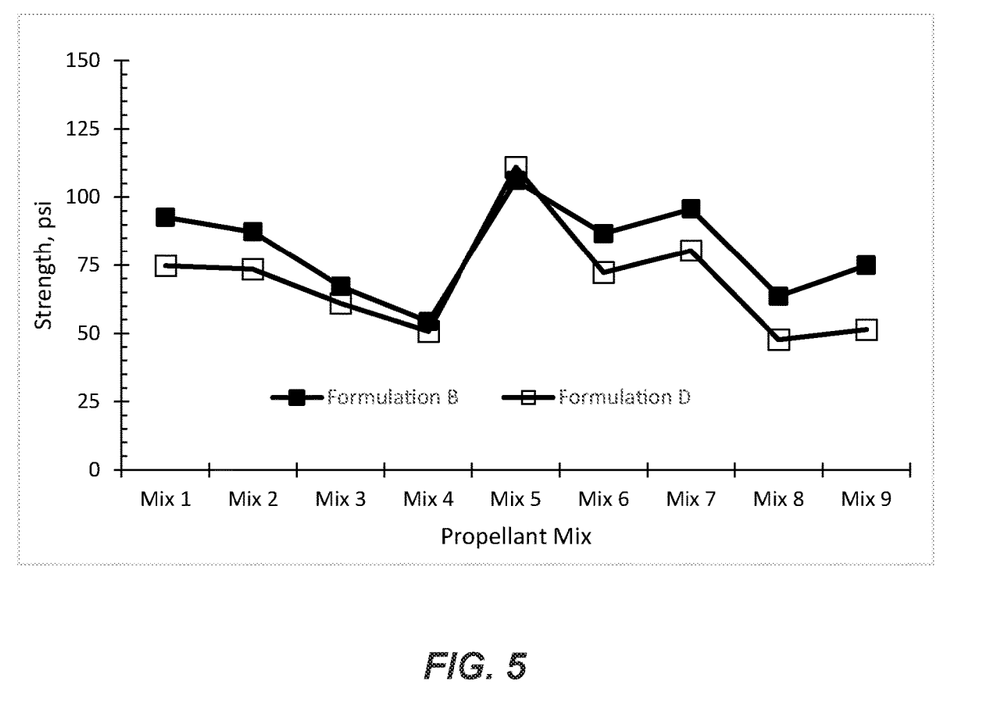
FIG. 5 is a graph illustrating rectangular bond-in-tension strength testing of conventional liners compared with a liner formed from a precursor formulation according to embodiments of the disclosure.

FIG. 4 is a graph illustrating 90-degree peel testing of a conventional liner (e.g., Formulation D) (open square symbol) compared with a liner formed from a precursor formulation according to embodiments of the disclosure (e.g., Formulation B) (solid square symbol). The peel testing was conducted at 72° F. and at 5 inches per minute. FIG. 4 shows strength as a function of composition. FIG. 5 is a graph illustrating rectangular bond-in-tension strength testing of a conventional liner (e.g., Formulation D) (open square symbols) compared with a liner formed from a precursor formulation according to embodiments of the disclosure (e.g., Formulation B) (solid square symbols). The rectangular bond-in-tension strength testing was performed following a 14 day cure of the liner, and was conducted at 135° F. and at 0.02 inches per minute. FIG. 5 shows strength as a function of composition. Referring to FIGS. 4 and 5 together, the liner formed from the precursor formulation according to embodiments of the disclosure displayed equivalent or higher peel strength in comparison to the conventional liners. This suggests that the liners of the disclosure were as strong as, if not stronger than conventional liners, demonstrating that the use of the blocked isocyanate curative in the liners increased the crosslinking density of the propellant polymer.

Figure 6:
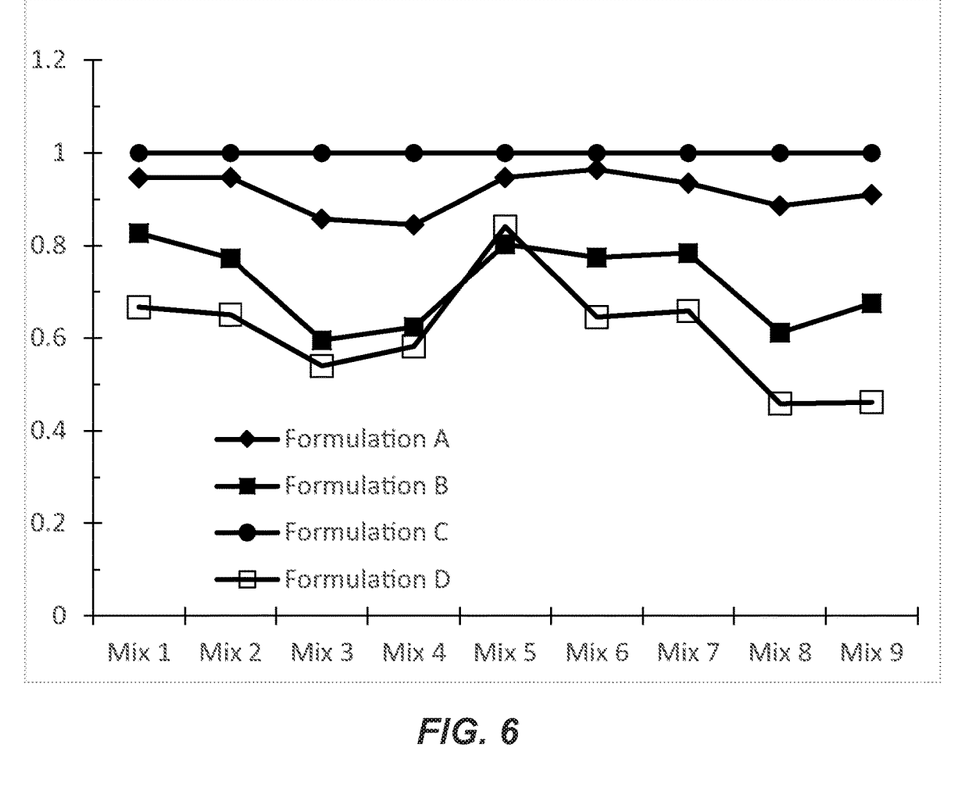
FIG. 6 is a graph illustrating rectangular bond-in-tension strength testing of slow-reacting isocyanate liners and conventional liners compared with a liner formed from a precursor formulation according to embodiments of the disclosure.
Figure 7:
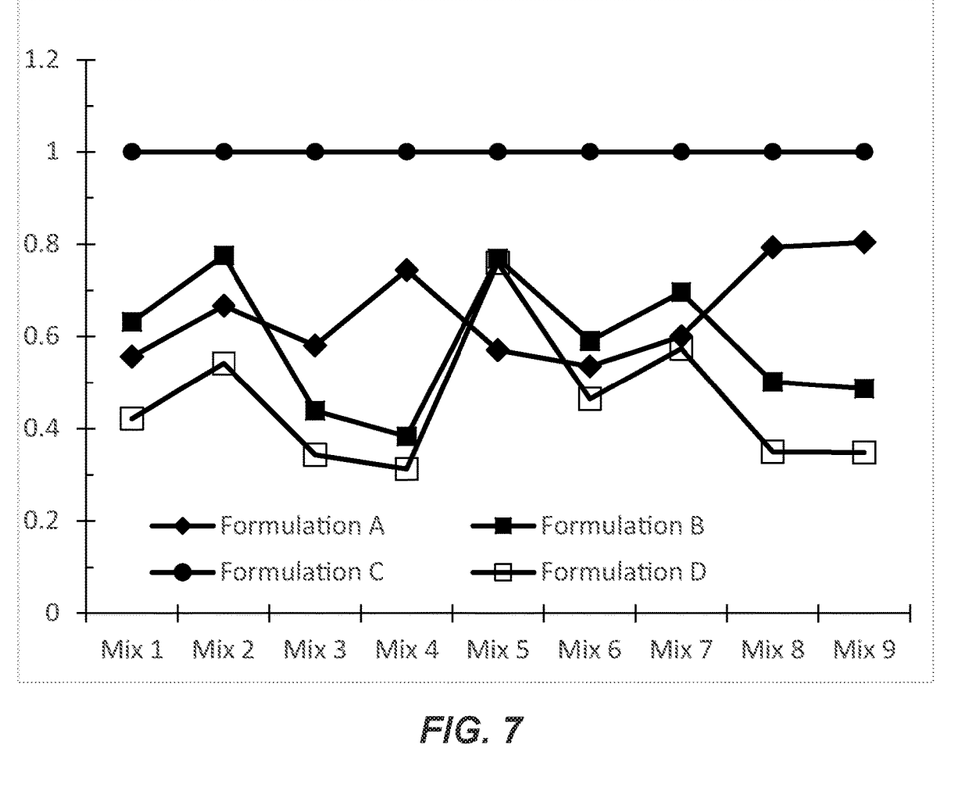
FIG. 7 is a graph illustrating 90-degree peel testing of slow-reacting isocyanate liners and conventional liners compared with a liner formed from a precursor formulation according to embodiments of the disclosure.

FIG. 6 is a graph illustrating rectangular bond-in-tension strength testing of slow-reacting isocyanate liners (e.g., Formulation A) (solid diamond symbols) and conventional liners (e.g., Formulation D) (open square symbols) compared with a liner formed from a precursor formulation according to embodiments of the disclosure (e.g., Formulation B) (solid square symbols). FIG. 6 shows relative strength (e.g., tensile strength) as a function of composition. FIG. 7 is a graph illustrating 90-degree peel testing of slow-reacting isocyanate liners (e.g., Formulation A) (solid diamond symbols) and conventional liners (e.g., Formulation D) (open square symbols) compared with a liner formed from a precursor formulation according to embodiments of the disclosure (e.g., Formulation B) (solid square symbols). FIG. 7 shows relative strength as a function of composition. In both FIGS. 6 and 7, the formulations were normalized to Formulation C (solid circle symbols), which is a polyurethane-based coating (commercially available from Socomore (Rhome, Tex.) under the Chemglaze® tradename). Referring to FIGS. 6 and 7 together, in a non-optimized liner formulation formed in accordance with a precursor liner formulation of the disclosure, the liner including a blocked isocyanate curative exhibited similar behavior to that of a liner including a slow-reacting isocyanate curative when tested with an inert HTPB propellant.

Unexpectedly, DEM-blocked isocyanate curatives were found to be advantageous over other isocyanates, including slow-reacting isocyanate curatives and other blocked isocyanate curatives. This was unexpected because the isocyanate curatives had similar chemical compositions, as well as similar functions. Some isocyanate curatives that were less reactive with liner polymers were found to have limited solubility in those liner polymers, which inhibited the ability of the blocked isocyanate curative to remain within the liner, and thus available to diffuse into the propellant polymer to form a strong attachment between the liner and the propellant. The limited solubility of the blocked isocyanate curative in the liner polymer also prevented the curative from being protected against environmental effects such as moisture, which can have a detrimental impact on the effectiveness of the curative. For example, blocked isocyanate curatives including nitrophenol derivatives were found to have limited solubility in liner polymers such as HTPB, which impeded the ability of the blocked isocyanate curative to behave as a propellant reinforcing curative for the reasons discussed above. However, DEM-blocked isocyanates did not display similar behavior. Conversely, the DEM-blocked isocyanates were soluble in liner polymers such as HTPB, functioned as a source of diffusible curative within the liner, and were thus able to behave as a propellant reinforcing curative. DEM-blocked isocyanates also provided the additional advantage of having a relatively low unblock temperature (about 110° C.), which may have resulted in a heightened reactivity with the propellant polymer.

Although the foregoing descriptions contain many specifics, these are not to be construed as limiting the scope of the disclosure, but merely as providing certain exemplary embodiments. Similarly, other embodiments of the disclosure may be devised that do not depart from the scope of the disclosure. For example, features described herein with reference to one embodiment may also be provided in others of the embodiments described herein. The scope of the embodiments of the disclosure is, therefore, indicated and limited only by the appended claims and their legal equivalents, rather than by the foregoing description. All additions, deletions, and modifications to the disclosure, as disclosed herein, which fall within the meaning and scope of the claims, are encompassed by the disclosure.

What is claimed is:

1. A precursor formulation of a liner, comprising:
   a liner polymer comprising a polyether, a fluorinated polyether, a polyurethane, an epoxy, a polysulfide, a polyethylene oxide, a polybutadiene, or a combination thereof;
   a curative formulated to react with the liner polymer; and
   a blocked curative formulated to be substantially unreactive with the liner polymer, the blocked curative comprising an isocyanate compound that has been pre-reacted with a blocking agent to substantially prevent the isocyanate compound from reacting with the liner polymer at room temperature.

2. The precursor formulation of claim 1, wherein the liner polymer comprises hydroxyl functional groups.

3. The precursor formulation of claim 1, wherein the liner polymer comprises one or more of a hydroxyl terminated polybutadiene or a hydroxyl terminated polyether.

4. The precursor formulation of claim 1, wherein the liner polymer comprises from about 10% by weight to about 85% by weight of the precursor formulation.

5. The precursor formulation of claim 1, wherein the curative formulated to react with the liner polymer comprises one or more of an aromatic isocyanate or an aliphatic isocyanate.

6. The precursor formulation of claim 1, wherein the curative formulated to react with the liner polymer comprises one or more of methylene diphenyl diisocyanate, polymeric methylene diisocyanate, para-phenylene diisocyanate, toluene diisocyanate, dimer diisocyanate, or isophorone diisocyanate.

7. The precursor formulation of claim 1, wherein the isocyanate compound of the blocked curative comprises one or more of an aromatic isocyanate, an aliphatic isocyanate, or a cycloaliphatic isocyanate.

8. The precursor formulation of claim 1, wherein the isocyanate compound of the blocked curative comprises one or more of isophorone diisocyanate, isophorone diisocyanate trimers, dimer diisocyanate, dicyclohexylmethane-4,4'-diisocyanate, hexamethylene diisocyanate, hexamethylene diisocyanate trimers, cyclohexyl diisocyanate, or tetramethyl xylene diisocyanate.

9. The precursor formulation of claim 1, wherein the blocked curative comprises from about 1% by weight to about 5% by weight of the precursor formulation.

10. The precursor formulation of claim 1, wherein the blocking agent of the blocked curative comprises diethylmalonate, methylethylketoxime, or a combination thereof; and
the isocyanate compound of the blocked curative comprises hexamethylene diisocyanate, or isophorone diisocyanate.

11. A method of lining a rocket motor, comprising:
applying a precursor formulation of a liner to a rocket motor, the precursor formulation of the liner comprising:
a liner polymer;
a curative formulated to react with the liner polymer; and
a blocked curative formulated to be substantially unreactive with the liner polymer, the blocked curative comprising an isocyanate compound that has been pre-reacted with a blocking agent to substantially prevent the isocyanate compound from reacting with the liner polymer at room temperature;
reacting the liner polymer with the reactive curative to form a liner;
applying a precursor formulation of a propellant to the liner;
removing the blocking agent from the isocyanate compound of the blocked curative at an elevated temperature to generate a reactive isocyanate curing agent; and
reacting a propellant polymer of the precursor formulation of the propellant with the reactive isocyanate curing agent.

12. The method of claim 11, wherein reacting the liner polymer with the reactive curative comprises reacting the reactive curative with the liner polymer at a rate that is between about 15 times and about 100 times faster than a reaction rate of the blocked curative at a temperature less than about 100° C.

13. The method of claim 11, wherein reacting the liner polymer with the reactive curative to form a liner comprises reacting the liner polymer and the reactive curative without substantially reacting the blocked curative with the liner polymer.

14. The method of claim 11, further comprising reacting the propellant polymer with a propellant curative of the precursor formulation of the propellant.

15. The method of claim 11, further comprising diffusing the blocked curative into the precursor formulation of the propellant.

16. A rocket motor, comprising:
an insulation in a casing of a rocket motor;
a liner on the insulation, the liner comprising:
a reaction product of a liner polymer and a reactive curative; and
a blocked curative formulated to be substantially unreactive with the liner polymer,
the blocked curative comprising an isocyanate compound that has been pre-reacted with a blocking agent to substantially prevent the isocyanate compound from reacting with the liner polymer at room temperature, and
the blocking agent removed from the isocyanate compound of the blocked curative at an elevated temperature to generate a reactive isocyanate curing agent; and
a propellant on the liner, the propellant comprising:
a reaction product of a propellant polymer, the reactive isocyanate curing agent, and a propellant curative.

17. The rocket motor of claim 16, wherein the liner further comprises a residual amount of the propellant curative.

18. The rocket motor of claim 16, wherein the propellant further comprises a residual amount of the blocked curative.

19. The precursor formulation of claim 1, wherein the blocking agent of the blocked curative comprises diethylmalonate, dimethylpyrazole, 1,2-pyrazole, 1,2,4-triazole, diisopropylamine, methylethylketoxime, caprolactam, nitrophenol derivatives, or a combination thereof.

20. The precursor formulation of claim 1, wherein the liner polymer comprises a hydroxyl terminated polybutadiene, a hydroxyl terminated polyethylene, a hydroxyl terminated polyether, a carboxyl terminated polybutadiene, a butadiene terpolymer, or a combination thereof.

* * * * *